(12) United States Patent
Jin et al.

(10) Patent No.: US 10,339,620 B2
(45) Date of Patent: Jul. 2, 2019

(54) METHOD OF MANAGING TRANSPORTATION FARE, SERVER PERFORMING THE SAME AND SYSTEM PERFORMING THE SAME

(71) Applicant: LG CNS CO., LTD., Seoul (KR)

(72) Inventors: Ayoung Jin, Seoul (KR); Jaehoon Kim, Seoul (KR)

(73) Assignee: LG CNS CO., LTD, Seoul (KR)

(*) Notice: Subject to any disclaimer, the term of this patent is extended or adjusted under 35 U.S.C. 154(b) by 636 days.

(21) Appl. No.: 14/145,000

(22) Filed: Dec. 31, 2013

(65) Prior Publication Data

US 2014/0207538 A1 Jul. 24, 2014

(30) Foreign Application Priority Data

Jan. 9, 2013 (KR) ........................ 10-2013-0002692

(51) Int. Cl.
*G06Q 50/30* (2012.01)
*G07B 15/02* (2011.01)
(Continued)

(52) U.S. Cl.
CPC ............. *G06Q 50/30* (2013.01); *G06Q 10/00* (2013.01); *G06Q 20/045* (2013.01); *G07B 15/02* (2013.01); *G07F 9/026* (2013.01); *G07F 11/002* (2013.01)

(58) Field of Classification Search
CPC .................... G06Q 50/30; G07B 15/00–15/02
(Continued)

(56) References Cited

U.S. PATENT DOCUMENTS

| 4,240,146 A | * | 12/1980 | Iles | .................... G06Q 30/0284 |
| | | | | 705/417 |
| 4,977,502 A | * | 12/1990 | Baker | .................... G07B 15/00 |
| | | | | 232/7 |

(Continued)

FOREIGN PATENT DOCUMENTS

| GB | 1372180 A | * 10/1974 | ............. G07B 15/00 |
| KR | 10-2004-0032475 | 4/2004 | |
| KR | 10-2007-0037143 | 4/2007 | |

OTHER PUBLICATIONS

Furth, Integrating Electronic Fareboxes with Other On-Board Equipment, Final Report for Transit IDEA Project 4, Transportation Research Board of the National Academies, Sep. 1995 (Year: 1995).*

(Continued)

*Primary Examiner* — Daniel Vetter
(74) *Attorney, Agent, or Firm* — Ked & Associates, LLP

(57) ABSTRACT

Provided is a transit management server, system and method for managing transit fares for a transportation system. The method includes selecting, in a transit management server, at least one fare module according to a transit fare policy, the at least one fare module corresponding to a prescribed category of fare and configured to determine a fare based on the prescribed category, setting, in the transit management server, at least one parameter in the selected fare module, and transmitting, from the transit management server to at least one terminal communicatively coupled to the transit management server, the set parameter to update a corresponding fare module in the at least one terminal according to the transit fare policy.

13 Claims, 10 Drawing Sheets

(51) Int. Cl.
  *G06Q 20/04* (2012.01)
  *G06Q 10/00* (2012.01)
  *G07F 11/00* (2006.01)
  *G07F 9/02* (2006.01)

(58) Field of Classification Search
  USPC .................................. 705/13, 417; 235/384
  See application file for complete search history.

(56) References Cited

U.S. PATENT DOCUMENTS

| | | | | |
|---|---|---|---|---|
| 5,021,984 | A * | 6/1991 | Meade | G07B 1/00 708/146 |
| 5,043,561 | A * | 8/1991 | Kimata | G07B 11/00 235/375 |
| 5,991,749 | A * | 11/1999 | Morrill, Jr. | G06Q 20/04 705/13 |
| 6,959,282 | B2 * | 10/2005 | Kakihara | G06Q 30/0284 705/13 |
| 7,562,818 | B1 * | 7/2009 | Bierbaum | G07B 15/02 235/375 |
| 8,126,769 | B1 * | 2/2012 | Bierbaum | G07B 15/00 235/382 |
| 2002/0161729 | A1 * | 10/2002 | Andrews | G06Q 20/363 705/417 |
| 2005/0023345 | A1 * | 2/2005 | Furuyama | G06Q 20/18 235/382 |
| 2007/0061174 | A1 * | 3/2007 | Phillips | G06Q 30/02 705/5 |
| 2008/0116264 | A1 * | 5/2008 | Hammad | G06Q 20/045 235/382 |
| 2008/0179394 | A1 * | 7/2008 | Dixon | G06Q 20/027 235/380 |
| 2008/0208681 | A1 * | 8/2008 | Hammad | G06Q 20/045 705/13 |
| 2011/0153495 | A1 * | 6/2011 | Dixon | G06Q 20/10 705/39 |
| 2011/0208645 | A1 * | 8/2011 | Knauft | G06Q 20/045 705/39 |
| 2013/0173357 | A1 * | 7/2013 | Lishak | G06Q 10/00 705/13 |
| 2014/0019216 | A1 * | 1/2014 | Jo | G06Q 20/3278 705/13 |

OTHER PUBLICATIONS

Abkowitz, et al., Automatic Fare Collection in Transit: A Synthesis of Current Practice, 1987, Transport Reviews, vol. 7, Issue 1, p. 53-63 (Year: 1987).*

* cited by examiner

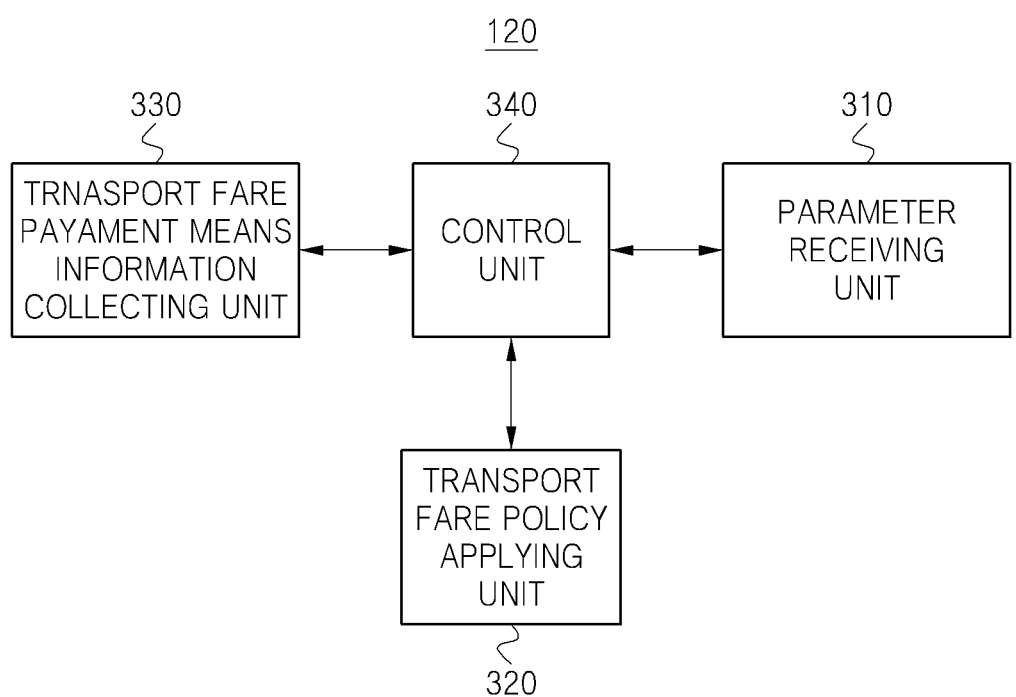

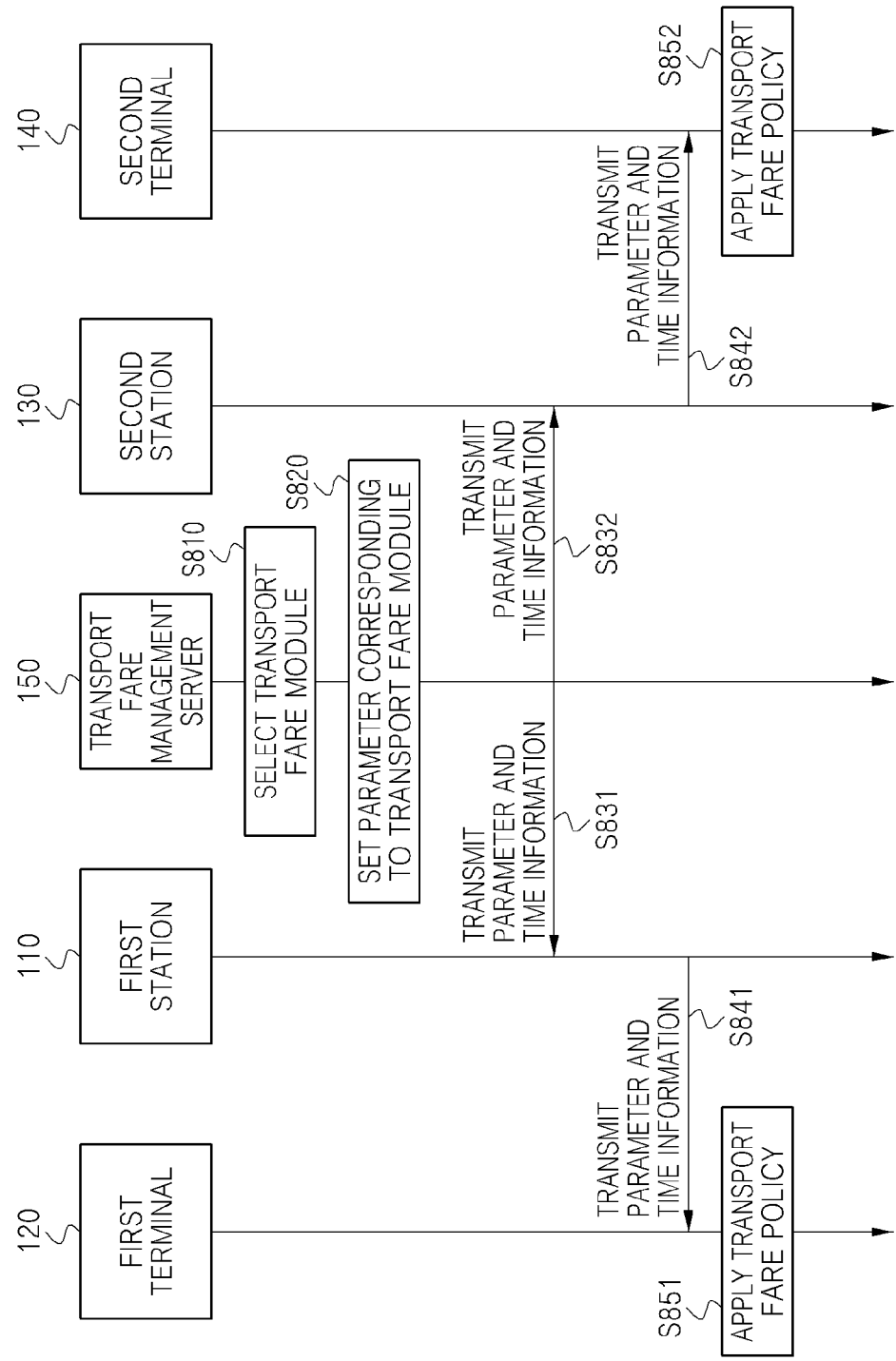

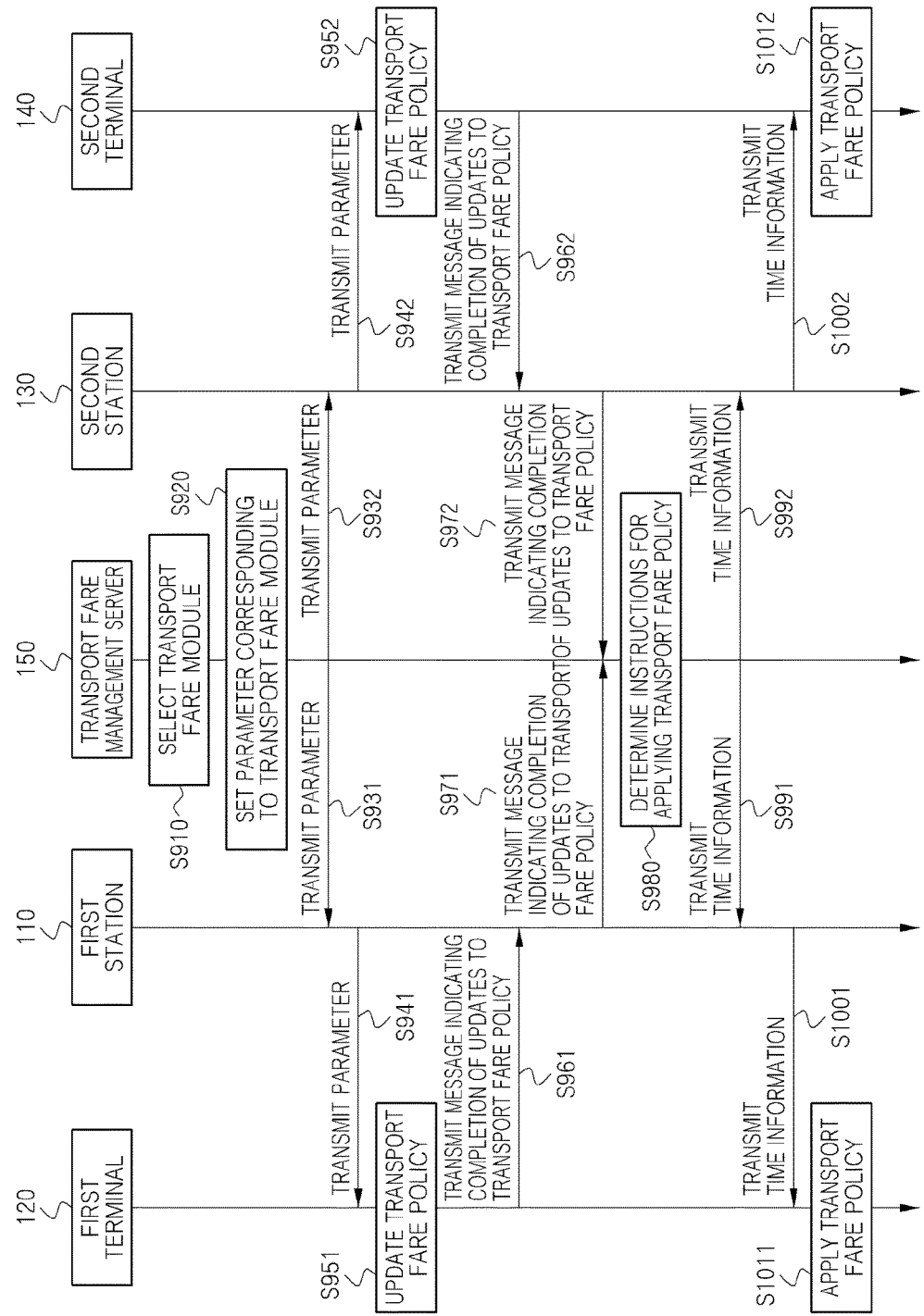

METHOD OF MANAGING TRANSPORTATION FARE, SERVER PERFORMING THE SAME AND SYSTEM PERFORMING THE SAME

CROSS-REFERENCE TO RELATED APPLICATION(S)

This application claims priority under 35 U.S.C. § 119 to Korean Application No. 10-2013-0002692 filed on Jan. 9, 2013, whose entire disclosure is hereby incorporated by reference.

BACKGROUND

1. Field

The present disclosure relates to a transit fare management technology, and more particularly, to a transit fare management method, a transit fare management server and a transit fare management system that may apply a transit fare policy regardless of changing and updating a previous transit fare policy and introducing new transit fare policy.

2. Background

A transit or transport fare using in a transport fare management system includes various fares like a section fare, a distance proportional fare, a single fare, a commuter pass, etc. Herein, various techniques for managing a transport fare according to a transport fare are provided.

The Korean Patent Registration No. 10-2007-0037143 associates with a distance proportional transport fare management technique, by calculating a moving distance by transport means and a total moving distance through performing a transport card and RF communication and calculating a transport fare according to the calculated moving distance, associating with the distance proportional transport fare management method reasonably calculating a transport fare according to a total moving distance although a plurality of transport means is used.

The Korean Patent Registration No. 10-2004-0032475 associates with a fare collecting technique per time, by including a timer extracting a time value contacted with a transport card, a fare table in recording a fare according to each of a time value, a fare collecting unit collecting a fare by searching the extracted time value in the fare table, associating with a fare collecting terminal per time collecting the fare according to a time of using transport means.

The prior techniques provide techniques managing received information from the transport card in a specific method. But, these techniques just presents a transport fare reasonably determining the transport fare. That is, only various techniques about a method of calculating a transport fare associated with the transport fare are provided.

Recently, a transport fare management system that independently manages each of a transport fare of a plurality of the transport means is being changed to a central management system that collectively manages all of a transport fare. That is, an independently managing transport fare management system according to an area classification of transport means is being changed to a central management system collectively managing a plurality of transport means or by introducing a transfer system.

Herein, because the transport fare management system is designed by only considering a specific fare when the transport fare management system is established, there is a problem that an established transport fare management system is entirely redesigned when a previous transport fare is changed.

The prior techniques may not suggest a solution for the above described problems. That is, a centralized and modularized transport fare management system capable of more efficiently updating fare policies in a plurality of areas of a plurality of transport means without additional costs is required.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 3 is a block diagram illustrating first and second terminals in FIG. 1;

FIG. 8 is a flowchart illustrating a transport fare management procedure performed on a transport fare management system according to an example embodiment of the present disclosure; and FIG. 9 is a flowchart illustrating a transport fare management procedure performed on a transport fare management system according to another example embodiment of the present disclosure.

DETAILED DESCRIPTION

Figure 1:
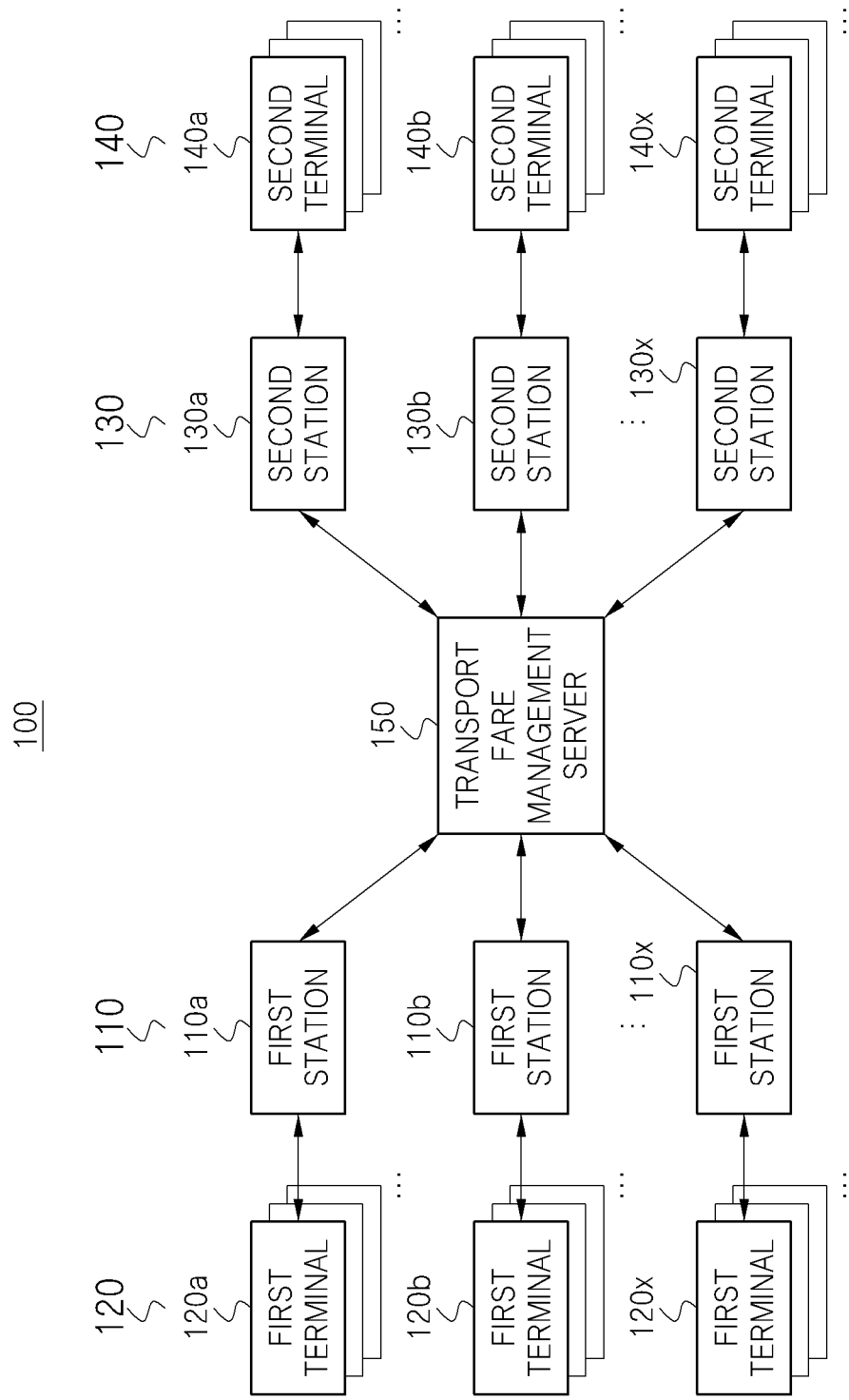
FIG. 1 is a diagram illustrating a transport fare management system according to an example embodiment of the present disclosure.

Explanation of the present disclosure is merely an embodiment for structural or functional explanation, so the scope of the present disclosure should not be construed to be limited to the embodiments explained in the embodiment. That is, since the embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms. The above terms are used only to distinguish one component from another. For example, a first component may be referred to as a second component without departing from the scope of rights of the present disclosure, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "~ between", "immediately~between" or "adjacent to ~" and "directly adjacent to ~" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps are used for the sake of explanation and do not described order of respective steps. The respective steps may be changed from a mentioned order unless specifically mentioned in context. Namely, respective steps may be performed in the same order as described, may be substantially simultaneously performed, or may be performed in reverse order.

In describing the elements of the present disclosure, terms such as first, second, A, B, (a), (b), etc., may be used. Such terms are used for merely discriminating the corresponding elements from other elements and the corresponding elements are not limited in their essence, sequence, or precedence by the terms.

In the foregoing exemplary system, the methods are described based on the flowchart as sequential steps or blocks, but the present disclosure is not limited to the order of the steps and some of them may be performed in order different from the order of the foregoing steps or simultaneously. Also, a skilled person in the art will understand that the steps are not exclusive but may include other steps, or one or more steps of the flowchart may be deleted without affecting the scope of the present disclosure.

The terms used in the present application are merely used to describe particular embodiments, and are not intended to limit the present disclosure. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present application.

In conventional transport fare management systems, a disadvantage exists in that the entire transport fare system must be newly established whenever various fares are introduced or changed. It is desirable, however, that a transport fare management system be capable of entirely re-applying a changed fare for a plurality of areas or a plurality of transport means without additional costs.

Embodiments provided herein is a transport fare management method, a transport fare management server and a transport fare management system that modularizes various transport fares used in a transport fare policy and allows selection of one of the complex transport fares modularized according to the transport fare policy to only transmit a parameter for each of the modules to a terminal. The transport fare management method may be simply applied to a transport fare policy when a new transport fare policy is established or a previous transport fare policy is changed without requiring a new development of a transport fare management system.

Embodiments of the present disclosure provide a transport fare management method, a transport fare management server and a transport fare management system that allow selecting a changed transport fare module in comparison with a previous transport fare policy among a selected transport fare modules according to a transport fare policy and transmitting a parameter of the selected transport fare module to a terminal.

Embodiments of the present disclosure provide a transport fare management method, a transport fare management server and a transport fare management system that allow instructing to apply a transport fare policy to a terminal of each of transport means about distinct transport means associated with each other. The transport fare management method may entirely reflect a new transport fare policy by applying the transport fare policy about each of distinct transport means at the same time.

FIG. 1 is a diagram illustrating a transport fare management system according to an example embodiment of the present disclosure. A transport fare management system 100 may include a plurality of stations 110 and 130, a plurality of terminals 120 and 140 and a transport fare management server 150. The plurality of the stations 110 and 130 may be connected with each of the plurality of the terminals 120 and 140 and server 150 through a network.

In embodiments, for convenience's sake, the plurality of the stations 110 and 130 will be described as the first station 110 and the second station 130. Herein, the first and second stations 110 and 130 may be used to represent separate transport means. For example, first transport means may correspond to an urban bus, second transport means may correspond to a subway and the first and second transport means may be associated with a transport fare policy with each other. The association may be generated due to a transit system. Herein, the first station 110 and a first terminal 120 may be associated with the first transport means and the second station 130 and a second terminal 140 may be associated with the second transport means.

Meanwhile, such examples of stations and terminals described in the above are merely used for convenience and should not be construed to limit the scope of the present disclosure. That is, a third station for third transport means other than the first and the second transport means and a third terminal may be connected with the transport fare management server 150.

Each of the plurality of the stations 110 and 130 may be connected with the plurality of the terminals 120 and 140 through the network and may correspond to a computing device that manages transport payment information collected by each of the plurality of the terminals 120 and 140. For example, each of the plurality of the stations 110 and 130 may be connected with the plurality of the terminals 120 and 140 and may correspond to a server, a desktop, a laptop, a smart phone or a personal computer that manages the transport payment information. Moreover, the plurality of terminals 120 and 140 may be various types of terminals in a particular station, a bus associated with the station or region, or the like.

For example, a first station 110a may correspond to a station that manages payment information about an urban bus fare of Seoul city and the plurality of the terminals installed on the urban bus of Seoul city may correspond to a plurality of first terminals 120a.

For another example, another first station 110b may correspond to a station that manages payment information for an urban bus system of a different region, for example Gyeonggi-do in Korea, and the plurality of the terminals 120 installed on an urban bus of Gyeonggi-do may correspond to a plurality of first terminals 120b.

For still another example, a second station 130a may correspond to a station that manages payment information about a subway fare of Seoul city and the plurality of the terminals installed on a subway station of Seoul city may correspond to a plurality of second terminals 140a. It should be appreciated, however, that the first and second stations 110 and 130 may represent a network device assigned to a particular transit station, type of transit, or region and are not limited to the specific configuration as set forth herein.

Each of the plurality of the terminals 120 and 140 may be connected with fare payment means and collects the transport payment information. For example, each of the plurality of the terminals 120 and 140 may be connected with a transport card through a RF communication and may correspond to a bus fare terminal or a subway fare terminal that may collect the transport payment information by the transport card.

In embodiments, the transport fare payment means does not only include a physically implemented transport card and may include every payment means being connectable with the plurality of the terminals 120 and 140 to be used to pay for the transport fare. For example, the transport fare payment means may be one of a bus card, a credit card, a cell phone, a smart phone being connectable with a transport fare terminal to be used to pay for the transport fare or another appropriate means of payment.

The transport fare management server 150 may correspond to a computing device that performs a transport fare management method and may be managed by a transport fare management company. The transport fare management server 150 will be described with reference to FIGS. 4A and 4B.

Figure 2:
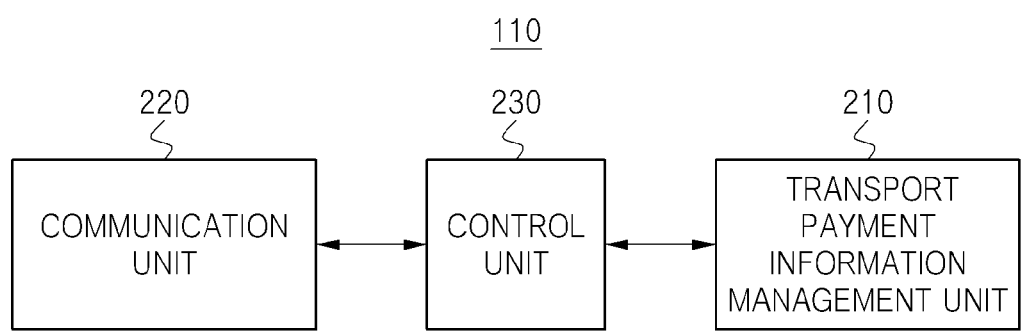
FIG. 2 is a block diagram illustrating first and second stations in FIG. 1.

FIG. 2 is a block diagram illustrating first and second stations in FIG. 1. In embodiments, the first and the second stations are merely used to indicate separate transport means. Hereinafter, for convenience's sake, the first station 110a is used for managing the urban bus of Seoul city instead of using each of the first and the second stations 110 and 130.

Referring to FIG. 2, the first station 110a includes a transport payment information management unit 210, a communication unit 220 and a control unit 230.

The transport payment information management unit 210 manages the transport payment information collected by the plurality of the first terminals 120a. Herein, the transport payment information may correspond to information about the transport fare that each of the plurality of the first terminals 120a charges to specific transport payment means. In one embodiment, the transport payment information management unit 210 may store the transport payment information in a payment information database and manage the stored transport payment information. The transport payment information is received by the each of the plurality of the first terminals 120a.

The communication unit 220 performs a communication with the plurality of the first terminals 120a and the transport payment management server 150. In more detail, the communication unit 220 may receive a parameter for a transport payment module selected according to the transport payment policy from the transport payment management server 150.

In one embodiment, the communication unit 220 may receive a parameter and time information and may transmit the received parameter and time information to the plurality of the first terminals 120a. The parameter corresponds to the transport payment module selected according to the transport fare policy from the transport payment management server 150. The time information indicates a time to apply the transport fare policy such that updated fares are made effective at prescribed times. These procedures will be described in FIG. 8.

In another embodiment, the communication unit 220 may receive a status message regarding completion of updates the transport fare policy from the plurality of the first terminals 120a and may transfer the received status related to completion of updates to the transport fare policy to the transport fare management server 150. That is, the communication unit 220 performs a role in mediating communication between the transport fare management server 150 and the plurality of the first terminals 120a on the transport fare management system 100. These procedures will be described in FIG. 9. Moreover, the control unit 230 controls an operation and a data flow of the transport payment information management unit 210 and the communication unit 220.

FIG. 3 is a block diagram illustrating first and second terminals of FIG. 1. In embodiments, the first and the second terminals 120 and 130 are merely used to indicate separate transport means. Hereinafter, for convenience's sake, the following description is made with respect to the first terminal 120a, for example the urban bus system in Seoul, rather than both the first and the second terminals 120 and 140.

Referring to FIG. 3, each of the plurality of the first terminals 120a may include a parameter receiving unit 310, a transport fare policy applying unit 320, a transport payment means information collecting unit 330 and a control unit 340. The parameter receiving unit 310 may receive a parameter for the transport fare module selected according to the transport fare policy from the communication unit 220 in the first station 110a. The transport fare policy applying unit 320 may apply the transport fare policy based on the received parameter. For example, the transport fare policy applying unit 320 may change a previously applied parameter (e.g., single bus fare $1.00) into the received parameter (e.g., single bus fare $1.20).

In one embodiment, the transport fare policy applying unit 320 may apply the transport fare policy at a specified time based on time information received from the communication unit 220 in the first station 110a. Herein, the transport fare policy applying unit 320 may receive the parameter and the time information at the same time or may receive the parameter and then the time information from the communication unit 220 in the first station 110a.

The transport fare payment means information collecting unit 330 may collect data being obtainable by the transport fare payment means. First, the transport fare payment means information collecting unit 330 may collect objective data from the transport fare payment means. Herein, the objective data may indicate data irrespective of an owner of the transport fare payment means. For example, the objective data may indicate a bus boarding time or a bus departure time and the bus boarding and departure times may be accessed when the transport fare payment means accesses a corresponding first terminal 120a. In another example, the objective data may correspond to transfer data indicating whether other transport means were used before the urban bus was boarded. In still another example, the objective data may correspond to GPS data indicating an urban bus boarding area.

Then, the transport fare payment means information collecting unit 330 may collect subjective data from the transport fare payment means. Herein, the subjective data may indicate data having values specific to an owner of the transport fare payment means and may not guarantee objectivity of the data. For example, the subjective data may correspond to data indicating a type of owners for the transport fare payment means. The type of owners may include, for example, adults, adolescents, the elderly, students, people with disabilities or the like. In another example, the subjective data may correspond to data indicating a birth date to determine a user age. That is, the data being subjectively obtained does not guarantee objectivity because the transport fare payment means information collecting unit 330 may recognize an adult as an adolescent in case where the adult uses an adolescent bus card.

The control unit 340 controls the operation and the data flow of the parameter receiving unit 310 and the transport fare payment means information collecting unit 330.

Figure 4A:
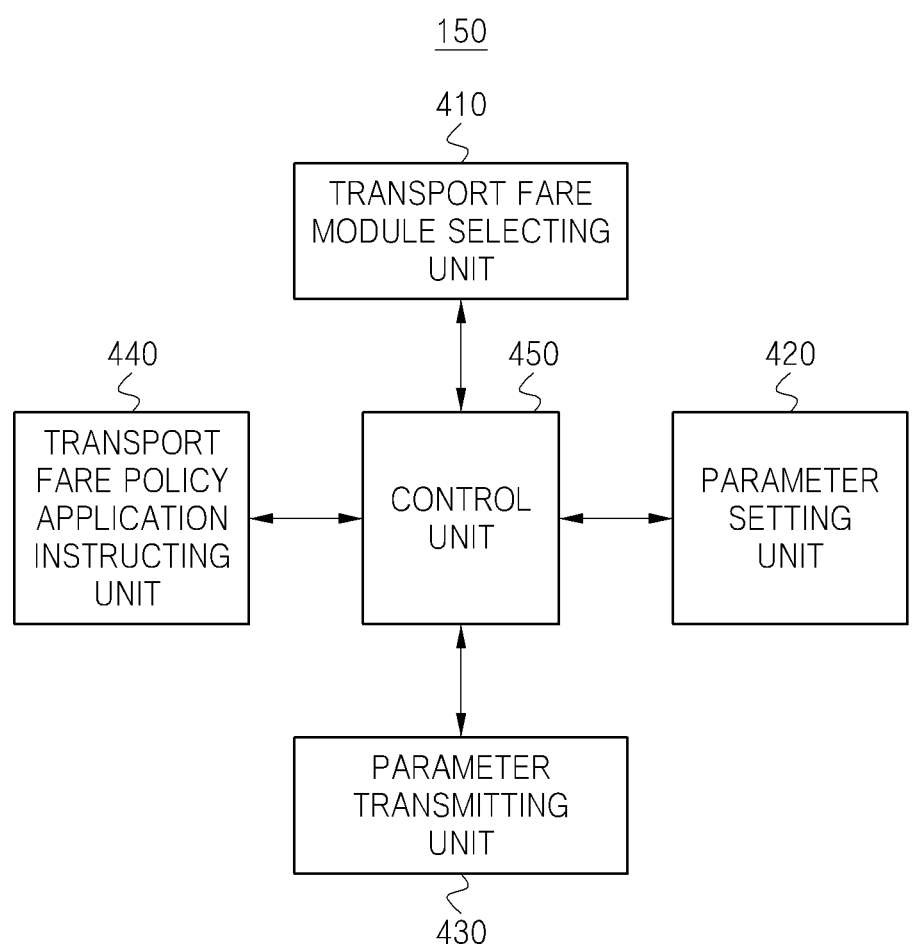
FIGS. 4A and 4B are block diagrams illustrating a transport fare management server in FIG. 1.
Figure 4B:
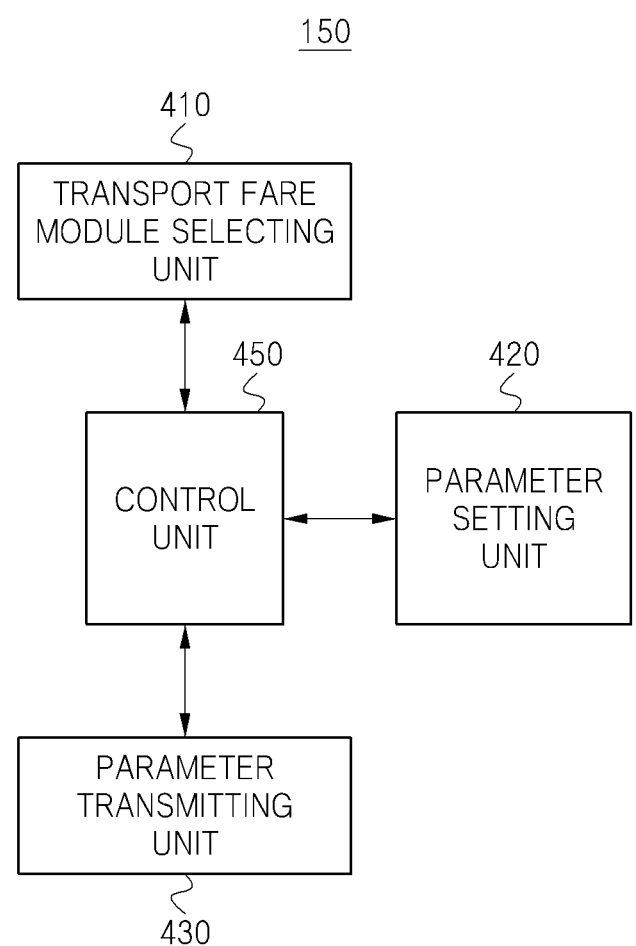

FIGS. 4A and 4B are block diagrams illustrating a transport fare management server in FIG. 1. In more detail, FIG. 4A and FIG. 4B respectively corresponds to embodiments of the transport fare management server 150, each of which may be implemented to include a combination of the various components.

Referring to FIG. 4A, the transport fare management server 150 may include a transport fare module selecting unit 410, a parameter setting unit 420, a parameter transmitting unit 430, a transport fare policy application instructing unit 440 and a control unit (or controller) 450.

Before each of components in the transport fare management server 150 is described, the transport fare module selected according to the transport fare policy will be described. The transport fare management server 150 may include a plurality of transport fare modules. Herein, the plurality of the transport fare modules may be predefined by the plurality of the first and the second terminals 120 and 140 and the transport fare management server 150. In one embodiment, the plurality of the transport fare modules may correspond to software components determining a specific transport fare policy through mutual combination.

In more detail, the transport fare policy may correspond to a transport fare determination system. The transport fare determination system determines the transport fare according to at least one of a fixed fare, a distance, a user type, a boarding time, commuter pass used for the transport means or another appropriate criteria. Herein, the transport fare management server 150 may determine the transport fare through one of the transport fare modules and may also determine the transport fare through the plurality of the transport fare modules respectively associated with the plurality of the transport fares. Herein, the complex transport fares may be determined according to the transport fare policy. That is, the specific transport fare policy may require that a fare be determined by combining the plurality of criteria and the transport fare management server 150 may include multiple transport fare modules to calculate the transport fares based on the plurality of criteria.

For example, the transport fare may be charged in proportion to a boarding distance and may include a transfer-discount when a passenger transfers to different transport means. In case of the transport fare charged differentially according to an age of a passenger, the transport fare policy may be determined by a combination of a distance proportional fare, a transfer discount fare or a user type fare. Herein, the transport fare may be calculated by the transport fare policy as a combination of a distance proportional fare module, a transfer discount fare module and a user type fare module to calculate the transport fare according to the transport fare policy.

In one embodiment, the plurality of the transport fare modules may include at least two of a single fare module, a section fare module, a distance proportional fare module, a profile fare module, a time section fare module, a pass master fare module, a pass penalty module, a profile penalty fare module or a transfer discount module.

Each of the transport fare modules will be described with reference to Table 1.

TABLE 1

| module | definition |
| --- | --- |
| Single fare module | Regardless of a boarding distance, a transport fare is charged only once when transport means are first boarded or first departed. |
| Section fare module | As an expansion of a zonal fare, other fare is charged in case of user's moving within a stage or moving to another stage. |
| Distance proportion fare module | A transport fare is charged in proportion to a boarding distance. |
| Profile fare module | A transport fare is charged according to a type of passengers such as an adult, an adolescent, the elderly, a student and people with disabilities. |
| Time section fare module | In case where transport means are boarded at a predefined time, a transport fare is discounted as much as a predefined amount. |
| Pass master fare module | In case where transport fare payment means corresponding to a commuter pass are used, a transport fare is not charged when transport fare payment means are used in a predefined period, a predefined number and an predefined area. |
| Pass penalty fare module | When transport fare payment means corresponding to a commuter pass are used, additional fare is charged in case where predefined restrictions (a period, a number or an area) are violated or transport fare payment means are not tagged in a user's departure. |
| Profile penalty fare module | According to a passenger type, additional fare is charged in proportion to a boarding distance or a moving section of stage. |
| Transfer discount module | In case where another transport means are used before transport means are boarded, a transport fare is discounted as much as a predefined amount. |

In Table 1, seven transport fare modules may be used to describe an example embodiment of a transport fare policy and this example embodiment may be changed according to a new transport fare policy. This change may include at least one operation of addition, subtraction or update of the transport fare modules. It should be appreciated that the list of transport fare modules described in Table 1 is not intended to be exclusive, and may include other types of fare modules or the listing modules may be configured to have different parameters.

Each of the plurality of the transport fare modules may include at least one of parameter. In detail, each of the transport fare modules may include a parameter required to calculate a transport fare. A parameter of each of the plurality of the transport fare modules in Table 1 according to one embodiment of the present disclosure will be described with reference to Table 2.

TABLE 2

| module | parameter |
| --- | --- |
| Single fare module | A single collection amount per user type, a single collection amount per transport means |
| Section fare module | A boarding fare per boarding stage, a departure fare per departure stage |
| Distance proportion fare module | A transport fare per boarding distance |
| Profile fare module | A user type classification, a user type identifier(a birth date) |
| Time section fare module | Start and finish times of a discount time, a discount amount |
| Pass master fare module | A commuter pass type, an allowable area, an allowable period, a maturity date |
| Pass penalty fare module | Excess fare per stage in case of a pass penalty |
| Profile penalty fare module | A user type classification, additional collection amount per boarding distance, excessive collection amount per moving section of stage |
| Transfer discount module | A transfer discount amount per user type, a transfer discount amount per boarding stage |

Table 2 indicates an example of the parameter and each of the plurality of the transport fare modules may have the parameter. The each of the plurality of the transport fare modules may have a predefined parameter to calculate the transport fare according to the corresponding transport fare.

For example, the time section fare module may be associated with a time section fare. The time section fare is used to discount a predefined fare from a total transport fare when a user boards within predefined time frames. Herein, the time section fare module may include {A, B, X} as a parameter when a boarding occurs between a specific time A and a specific time B and the transport fare policy adopts the time section fare for discounting X %.

That is, the parameter may correspond to an attribute of the transport fare module and the attribute may include an objectively or subjectively classified data obtainable when the transport fare payment means are used. The classified data are obtained by the transport fare payment information collecting unit 330 in the first terminal 120a. As described in FIG. 3, the transport fare module may include a parameter for calculating the transport fare. The parameter may correspond to an attribute used to calculate the transport fare and a value of the attribute may be obtained based on the data being objectively obtained or the data being subjectively obtained by the transport fare payment means. The data being objectively obtained by the transport fare payment means may include a bus boarding time and a departure time, a boarding area and a transfer status, and the data being subjectively obtained by the transport fare payment means may include a user type and an age.

Herein, the plurality of the transport fare modules is predefined in the plurality of the first and the second terminals 120 and 140 and the transport fare management server 150. When the transport fare management server 150 sets each of parameters in the plurality of the transport fare modules and transmits each of the parameters to the parameter receiving unit 310 in each of the plurality of the first and the second terminals 120 and 140, the transport fare policy applying unit 320 in each of the plurality of the first and the second terminals 120 and 140 may apply the transport fare policy by applying each of the parameters received in the plurality of the transport fare modules.

Referring back to FIG. 4A, the transport fare module selecting unit 410 selects at least one of the plurality of the transport fare modules according to the transport fare policy.

In more detail, the transport fare selecting unit 410 may select at least one transport fare module in the transport fare policy among the plurality of the transport fare modules.

For example, when a transport fare policy includes a single fare, a user type fare and a transfer discount fare, the transport fare module selecting unit 410 may select the single fare module, the profile fare module and the transfer discount module.

For another example, when a transport fare policy includes a section fare, a user type fare, a transfer discount fare and a commuter pass fare, the transport fare module selecting unit 410 may select a distance fare module, a profile fare module, a transfer discount module and a pass master fare module.

In one embodiment, when the transport fare policy includes data for a complex transport fare (e.g., fares that include multiple parameters and fare types), the transport fare module selecting unit 410 may select a corresponding complex transport fare module. In another embodiment, transport fare module selecting unit 410 may prompt for an input for at least one of the transport fare modules according to the transport fare policy. That is, the transport fare module selecting unit 410 causes an administrator of the transport fare management server 150 to select a specific transport fare module according to the transport fare policy.

The parameter setting unit 420 may set at least one parameter for at least one transport fare module selected by the transport fare module selecting unit 410. For example, when the transport fare module selecting unit 410 selects the single fare module, the user type fare module and the transfer discount module according to the transport fare policy, the parameter setting unit 420 sets at least one parameter associated with the single fare module, the profile fare module and/or the transfer discount module. That is, the parameter setting unit 420 may set a parameter for a single collection amount per user type, a user type classification, a user type identifier, a transfer discount amount per user type and another appropriate type of parameter in each of at least one of the transport fare modules.

For example, the parameter setting unit 420 may generate data to set each of the parameters of the above example, e.g., the parameter values for fare of the cost per user type, user type classifications, user type identifiers, and discount amount per user type. The data may indicate [{an urban bus of Seoul city}, {an adult, $1.20, an adolescent, $0.90, the elderly, $0.50, a student, $0.50, people with disabilities, $0}, {an adult, an adolescent, the elderly, a student, people with disabilities}, {an adult, 20 to 60 years of age; an adolescent above 10 years of age; under 20 years of age; the elderly, above 60 years of age}, {an adult, $2.00; an adolescent, $3.00; the elderly, $3.00; a student, $3.00; people with disabilities, $0}] of the first terminal 120a in an urban bus of Seoul city.

In one embodiment, when the transport policy includes at least one parameter, the parameter setting unit 420 may collect the at least one parameter to set each of the at least one parameter.

In another embodiment, the parameter setting unit 420 may prompt an input for a parameter according to a selection of a corresponding transport fare module. That is, the parameter setting unit 420 may request the administrator of the transport fare management server 15 to input each of the parameters for a specific transport fare module selected according to the transport fare policy.

The parameter transmitting unit 430 may transmit the set parameters to the plurality of the first and the second terminals 120 and 140 through the first and the second stations 110 and 130 for the first and the second terminals 120 and 140 to apply the transport fare policy.

In more detail, the parameter transmitting unit 430 may transmit at least one parameter set by the parameter setting unit 420 to the first and the second stations 110 and 130. Herein, each of the first and the second stations 110 and 130, respectively, transmits at least one of the parameters to the corresponding first and the second terminals 120 and 140 connected thereto. For example, when the parameter transmitting unit 430 transmits at least one parameter to the first station 110a that manages an urban bus system in the city of Seoul, the first station 110a may transmit the at least one parameter to the plurality of the second terminals 120a installed in the urban bus system of Seoul.

Herein, the first and the second terminals 120 and 140 receiving the at least one parameter may be able to define the plurality of the transport fare modules to be substantially the same as the transport fare management server 150. Then, the transport fare policy applying unit 320 in the first and the second terminals 120 and 140 may apply the transport fare policy by setting the received parameters to the transport fare module.

In one embodiment, the parameter transmitting unit 430 may detect a transport fare module changed on their parameter among the plurality of the transport fare modules that has an updated or changed parameter and the updated or new parameter of the detected transport fare module may be transmitted to the first and the second terminals 120 and 140 through the first and the second stations 110 and 130.

For example, in situations where a single fare module, a profile fare module and a transfer discount module selected according to a previously applied transport fare policy are applied to the first and the second terminals 120 and 140, when a new transport fare policy is applied to an adult fare among parameters included in a single fare module is changed from $1.20 to $1.30, data for parameters {an adult, $1.30; an adolescent, $0.90; the elderly, $0.50; a student, $0.50; people with disabilities, $0} included in the single fare module may be transmitted to the first and the second terminals 120 and 140 through the first and the second stations 110 and 130.

That is, when a new transport fare policy does not change a transport fare policy but simply changes a parameter in comparison with a previously applied transport fare policy, the parameter transmitting unit 430 may cause the first and the second terminals 120 and 140 to simply apply the new transport fare policy by collecting a changed parameter and transmitting the changed parameter to the first and the second terminals 120 and 140.

In one embodiment, the transport fare management server 150 may further include the transport fare policy application instructing unit 440. Herein, the transport fare policy application instructing unit 440 may transmit time information including a time in which a transport fare policy is to be applied by the first and the second terminals 120 and 140 to the first and the second terminals 120 and 140. In more detail, the transport fare policy application instructing unit 440 may transmit the time information for applying to the transport fare policy to the first and the second terminals 120 and 140 through the first and the second stations 110 and 130 so that the first and the second terminals 120 and 140 may apply the transport fare policy at a specific time. Herein, the time information may include data associated with time being applied to the transport fare policy and associated with an applying instruction. For example, an applying time identifier may include data for {2013.01.01, 09:00}. That is, the transport fare policy application instructing unit 440 may cause the first and the second terminals 120 and 140 to apply the updated transport fare policy at the specified time.

In one embodiment, the transport fare policy application instructing unit 440 may transmit time information to the first and the second terminals 120 and 140 after the parameter transmitting unit 430 transmits at least one parameter to the first and the second terminals 120 and 140.

In one embodiment, the transport fare policy application instructing unit 440 may transmit time information to the first and the second terminals 120 and 140 when the first and the second terminals 120 and 130 finish readying for applying the transport fare policy.

In more detail, when the transport fare policy applying unit 320 in the plurality of the first and the second terminals 120 and 140 sets a received at least one parameter to a plurality of the transport fare modules, a message indicating completion of updates to the transport fare policy may be transmitted to the transport fare policy application instructing unit 440 through the first and the second stations 110 and 130. Herein, when the transport fare policy application instructing unit 440 receives the completion message from the plurality of the first and the second 120 and 140, the transport fare policy application instructing unit 440 may determine that the new transport fare policy has been set and is ready to be applied, and may transmit time information to the first and the second terminals 120 and 140. The time information is used to apply the transport fare policy at the same time in all of the plurality of the first and the second 120 and 140.

The control unit 450 controls the transport fare module selecting unit 410, the parameter setting unit 420, the parameter transmitting unit 430 and an operation and data flow of the transport fare policy application instructing unit 440.

FIG. 4B is a block diagram illustrating a transport fare management server corresponding to a different example than the embodiment of FIG. 4A. The transport fare management server 150 may include the transport fare module selecting unit 410, the parameter setting unit 420, the parameter transmitting unit 430, and the control unit 450.

In more detail, each of the transport fare module selecting unit 410, the parameter setting unit 420 and the control unit 450 may perform an operation same as each of the corresponding components described in FIG. 4A. Herein, another operation of the parameter transmitting unit 430 in comparison with FIG. 4A is mainly described.

The parameter transmitting unit 430 may transmit the set parameter to the plurality of the first and the second terminals 120 and 140 through the first and the second stations 110 and 130 and may cause the first and the second terminals 120 and 140 to apply a transport fare policy.

In one embodiment, the parameter transmitting unit 430 may transmit time information including a time for applying a transport fare policy in the first and the second terminals 120 and 140 to the first and the second terminals 120 and 140.

In more detail, the parameter transmitting unit 430 may transmit time information to the first and the second terminals 120 and 140 through the first and the second stations 110 and 130. The time information is applied to a transport fare policy so that the first and the second terminals 120 and 140 applies the new transport fare policy at a specific time.

Herein, the time information may include data associated with a time when the transport fare policy is to be applied and an applying instruction. For example, an applying time identifier may include data for {2013.01.01, 09:00}. That is, the parameter transmitting unit 430 may cause the first and the second terminals 120 and 140 to apply the transport fare policy to be in effect at the same specified time, e.g., at 9:00 am on Jan. 1, 2013.

In one embodiment, the parameter transmitting unit 430 may transmit a set parameter and timing information to the first and the second terminals 120 and 140 at the same time.

Figure 5:
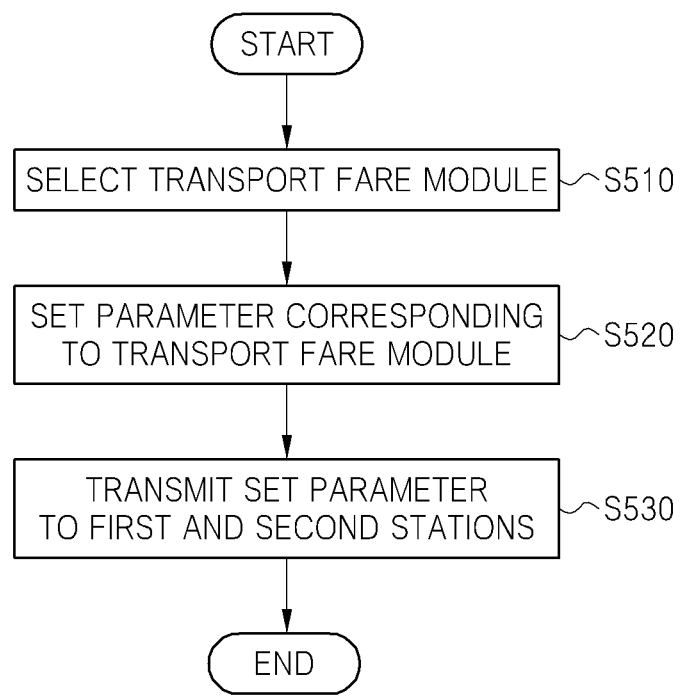
FIG. 5 is a flowchart illustrating a transport fare management procedure performed on a transport fare management server.

FIG. 5 is a flowchart illustrating a transport fare management procedure performed on a transport fare management server. The transport fare module selecting unit 410 may select at least one of a plurality of transport fare modules according to a transport fare policy, in step S510. In more detail, the transport fare selecting unit 410 may select at least one of the plurality of transport fare modules included in the transport fare policy. For example, when the transport fare policy includes the single fare, the user type fare and the transfer discount fare, the transport module selecting unit 410 may select the single fare module, the profile fare module and the transfer discount module.

In one embodiment, when a transport fare policy includes data associated with complex transport fares, the transport fare module selecting unit 410 may select a transport fare module associated with a transport fare corresponding to each of the data. In another embodiment, the transport fare module selecting unit 410 may prompt for an input for at least one of the complex transport fare modules according to the transport fare policy. That is, the transport fare module selecting unit 410 may cause an administrator of the transport fare management server 150 to select a specific transport fare module according to the transport fare policy.

The parameter setting unit 420 may set at least one of the parameters for at least one of the transport fare modules selected by the transport fare module selecting unit 410, in step S520.

For example, when the transport fare module selecting unit 410 selects the single fare module, the user type fare module and the transfer discount module according to a transport fare policy, the parameter setting unit 420 may set at least one parameter included in the single fare module, the profile fare module or the transfer discount module. That is, the parameter setting unit 420 may set parameters for the single collection amount per user type, the user type classification, the user type identifier, and/or the transfer discount amount per user type included in each of the transport fare module.

In one embodiment, when a transport fare policy is associated with data including at least one parameter, the parameter setting unit 420 may collect data for the parameters to set each of the parameters. The parameter transmitting unit 430 may transmit the set parameters to the plurality of the first and the second terminals 120 and 140 through the first and the second stations 110 and 130, in step S530.

In more detail, the parameter transmitting unit 430 may transmit at least one parameter set by the parameter setting unit 420 to the first and the second stations 110 and 130. Herein, the first and the second stations 110 and 130 may transmit the at least one parameter to respective ones of the first and the second terminals 120 and 140 connected thereto. For example, when the parameter transmitting unit 430 transmits each of the parameters to a first station 110a that manages an urban bus system in the city of Seoul, for example, the first station 110a may transmit the at least one of the parameters to a plurality of first terminals 120a installed in the urban bus system of Seoul.

Herein, because a first and a second terminals 120 and 140 that receive the parameters define the plurality of the transport fare modules to be substantially same as the transport fare management server 150, a transport fare policy applying unit 320 in the first and the second terminals 120 and 140 may apply the transport fare policy by setting the received parameters in the transport fare module.

Figure 6:
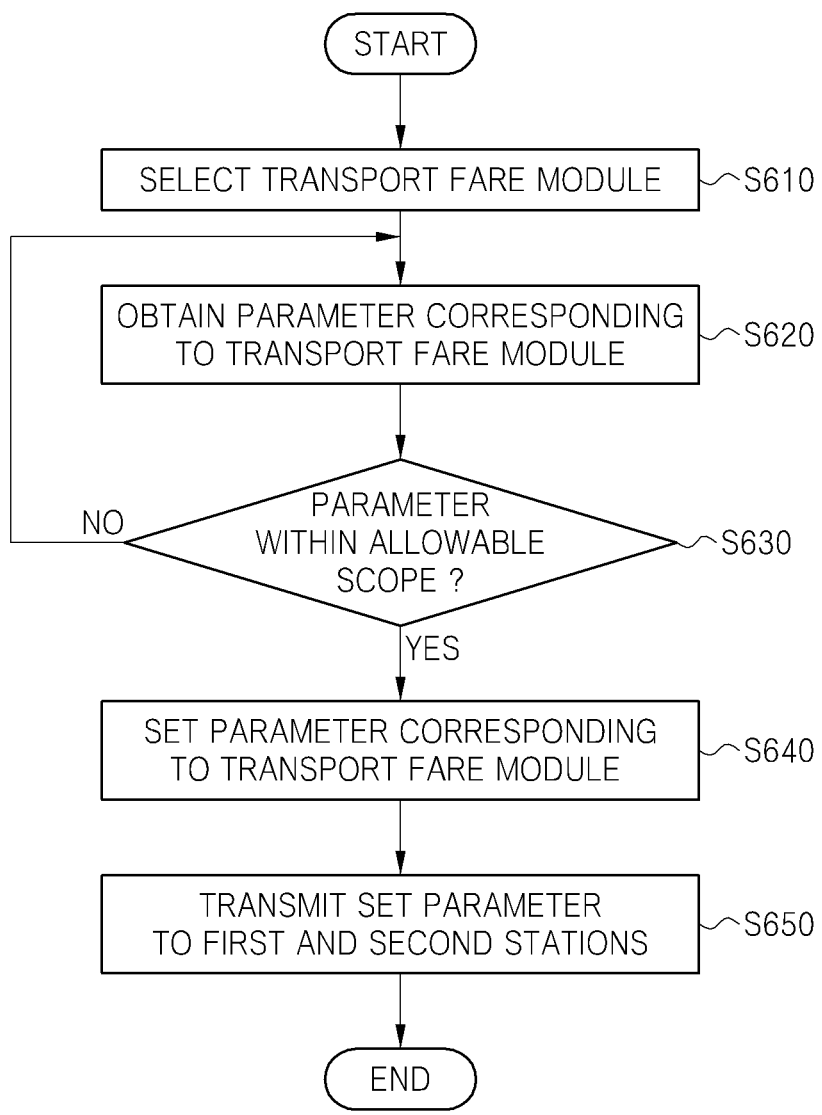
FIG. 6 is a flowchart illustrating a transport fare management procedure performed on a transport management server according to an example embodiment of the present disclosure.

FIG. 6 is a flowchart illustrating a transport fare management procedure performed on a transport management server according to an example embodiment of the present disclosure. The transport fare module selecting unit 410 may select at least one of a plurality of the transport fare modules according to a transport fare policy, in step S610.

In one embodiment, the parameter setting unit 420 may prompt for an input for a parameter according to a selection of a corresponding transport fare module, in step S620. That is, the parameter setting unit 420 may cause an administrator of the transport fare management server 150 to perform an input for at least one of the parameters associated with a selected specific transport fare module according to a transport fare policy.

Herein, the parameter setting unit 420 may check an allowable scope (or range) about input data when at least one of the parameters according to a selection of a corresponding transport fare module is inputted, in step S630. For example, when an input parameter corresponds to {an adult, $13.00; an adolescent, $0.90; the elderly, $0.50; a student, $0.50; people with disabilities, $0} and an allowable scope of each of parameters is preset to {a fare, under $2.00}, the parameter setting unit 420 may detect a parameter for {an adult, $13.00} to be over the allowable range of $2.00 among input parameters. Herein, the parameter setting unit 420 may prevent an error of the transport fare policy in advance by returning to step S620 for input of data for the detected parameter.

The parameter setting unit 420 may set an input parameter as at least one of parameter in at least a portion of transport fare modules selected by the transport fare module selecting unit 410 in step S640.

The parameter transmitting unit 430 may transmit at least one of the parameters, having been error checked, to the plurality of the first and the second terminals 120 and 140 through the first and the second stations 110 and 130, in step S650.

Herein, because a first and a second terminals 120 and 140 receiving at least one of the parameters defines a plurality of the transport fare modules to be substantially the same as the transport fare management server 150, a transport fare policy applying unit 320 in the first and the second terminals 120 and 140 may apply a transport fare policy by setting the received parameters to a transport fare module.

Figure 7:
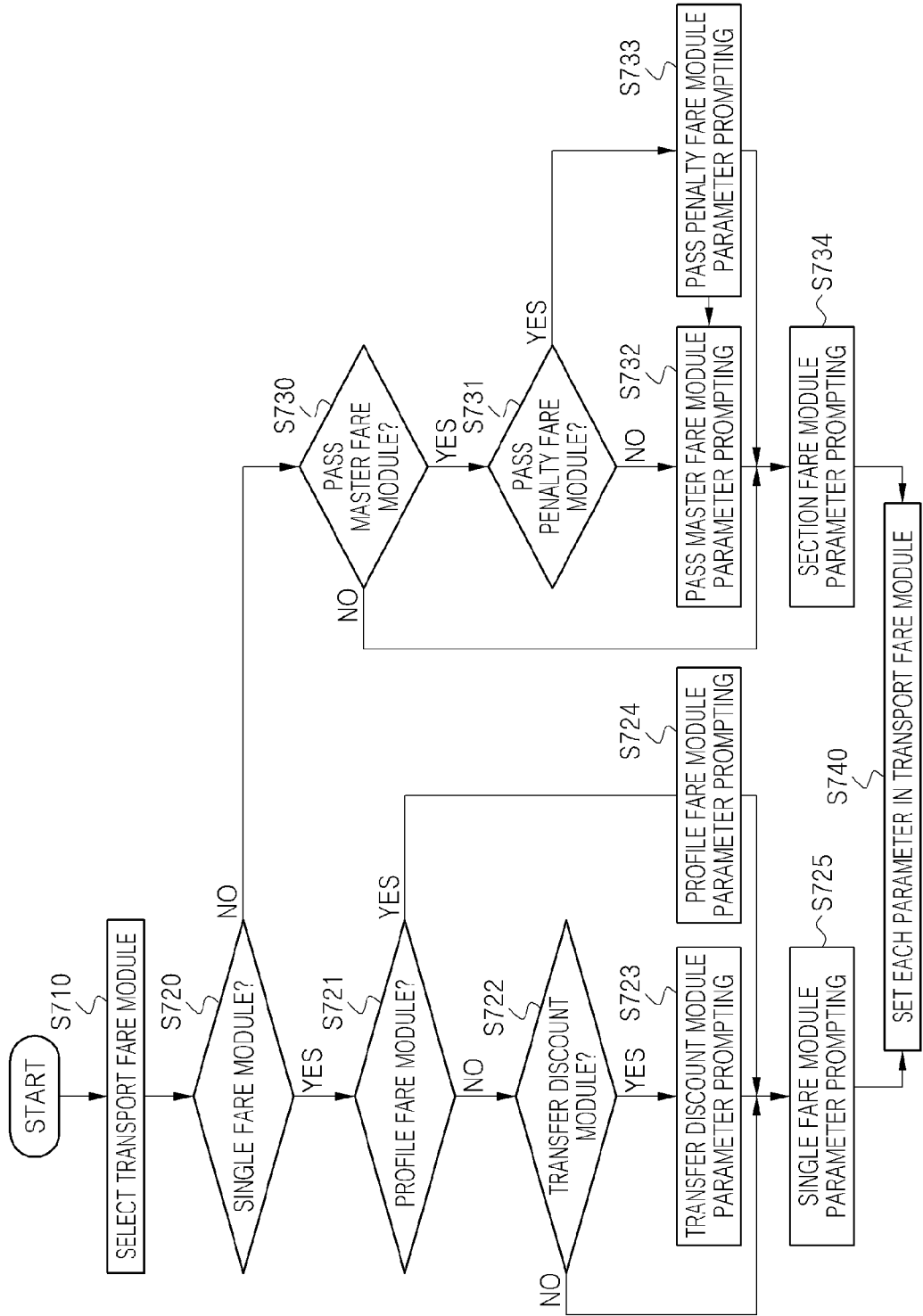
FIG. 7 is a flowchart illustrating an exemplary method of setting at least one of parameter for a transport fare module in the procedure of FIG. 5.

FIG. 7 is a flowchart illustrating an example of a step for setting at least one parameter for a transport fare module in FIG. 5 (S520). The transport fare selecting unit 410 may select at least one transport fare module included in a transport fare policy among the plurality of the transport fare modules, in step S710. The parameter setting unit 420 may set at least one parameter for at least one of the transport fare module selected by the transport fare module selecting unit 410.

In one embodiment, the parameter setting unit 420 may prompt for an input for a parameter according to a selection of a corresponding transport fare module.

FIG. 7 illustrates a procedure where the parameter setting unit prompts for an input for a parameter according to a selection of a corresponding transport fare module and sets at least one of the parameters in the transport fare module selected by the transport fare module selecting unit 410.

The parameter setting unit 420 may check whether a single fare module exists in the transport fare module selected by the transport fare module selecting unit 410, in step S720. Herein, when the single fare module is present, the parameter setting unit 420 may check whether a profile fare module exists in a selected transport fare modules, in step S721.

When the profile fare module does not exist, the parameter setting unit 420 checks whether a transfer discount module exists, in step S722. Herein, when the transfer discount module exist, the parameter setting unit 420 may prompt for an input for a parameter in a transfer discount amount per user type (e.g., an adult $0.20, a student $0.30, etc.) being in the transport discount module, in step S723. Herein, when the transfer discount module does not exist, the method moves to step S752.

When the profile fare module exists, the parameter setting unit 420 may prompt for an input for a parameter associated with a user type classification (e.g., an adult, a student, the elderly, an adolescent and people with disabilities) and a user type identifier (e.g., an age scope for an adult) in the profile fare module, in step S724.

As a procedure from step S721 to step S724 is a procedure of the single fare module, the parameter setting unit 420 may prompt for an input for a parameter associated with a single collection amount per user type (e.g., an adult $1.20, a student $0.90, etc.) in the single fare module, in step S725.

In step S720, when the single fare module does not exist, the parameter setting unit 420 may check whether a pass master fare module exists in the selected transport fare module, in step S730. When the pass master fare module exists, the parameter setting unit 420 may check whether a pass penalty fare module exists, in step S731. Herein, when the pass penalty fare module does not exist, the parameter setting unit 420 may prompt for an input for a parameter associated with a commuter pass type, a kind of commuter pass, an allowable area (region), an allowable period and a maturity date (e.g., a period pass, an unlimited pass, city of Seoul, one month, 2012.9.30) in the pass master fare module. Herein, when the pass penalty fare module exists, the parameter setting unit 420 may prompt for an input for a parameter for an excess fare per stage in case of a pass penalty (e.g., when one stage limit is exceeded, $0.50), in step S733 in the pass penalty fare module and move to step S734.

As the procedure from step S730 to step S733 is a procedure not of the single fare module but the section fare module, the parameter setting unit 420 may prompt for an input for a parameter associated with a boarding fare per boarding stage (e.g., one stage $1.20, two stage $1.25, three stage $1.30, etc.) in the section fare module, in step S734.

The parameter setting unit 420 may set the received parameters to each of the parameters associated with a selected transport fare modules when an input for the single fare module and the section fare module is completed, in step S740. The parameter transmitting unit 430 may transmit the set parameters to the plurality of the first and the second terminals 120 and 140 through the first and the second stations 110 and 130 and causes the first and the second terminals 120 and 140 to apply the new transport fare policy.

FIG. 8 is a flowchart illustrating a transport fare management procedure performed on a transport fare management system according to an embodiment of the present disclosure. The transport fare module selecting unit 410 may select at least one of a plurality of the transport fare modules according to a transport fare policy, in step S810. The parameter setting unit 420 may set at least one parameter for at least one of the transport fare modules selected by the transport fare module selecting unit 410, in step S820.

The parameter transmitting unit 430 may transmit the set parameters and timing information to the first and the second terminals 120 and 140 at the same time, in steps S831 and S832. Herein, each communication units 220 may transmit the parameters and the timing information to the parameter receiving unit 310 in the plurality of the first and the second terminals 120 and 140, in steps S841 and S842. A transport fare policy applying unit 320 in the plurality of the first and the second terminals 120 and 140 may apply a transport fare policy based on the timing information at a specific time, in steps S851 and S852.

FIG. 9 is a flowchart illustrating a transport fare management procedure performed on a transport fare management system according to another embodiment of the present disclosure.

The transport fare selecting unit 410 may select at least one transport fare module included in a transport fare policy among the plurality of the transport fare modules, in step S910. The parameter setting unit 420 may set at least one parameter in at least one of the transport fare modules selected by the transport fare module selecting unit 410, in step S920.

The parameter transmitting unit 430 may transmit the set parameters to each of the communication units 220 in the first and the second stations 110 and 130, in steps S931 and S932. Herein, each of the communication units 220 may transmit at least one of the parameters to the parameter receiving unit 310 in the plurality of the first and the second terminals 120 and 140, in steps S941 and S942.

A transport fare policy applying unit 320 in the plurality of the first and the second terminals 120 and 140 may update a transport fare policy by setting the received parameters to a plurality of the transport fare modules, in steps S951 and S952. Herein, the transport fare policy applying unit 320 in the plurality of the first and the second terminals 120 and 140 may transmit a message indicating completion of updating the transport fare policy to the communication unit 220 in the first and the second stations 110 and 130, in steps S871 and S872.

When the transport fare policy application instructing unit 440 receives the completion message from the plurality of the first and the second terminals 120 and 140 through the communication unit 220 in the first and the second stations 110 and 130, the transport fare policy application instructing unit 440 may determine to finish preparing to apply the transport fare policy and may determine an instruction for applying the transport fare policy to all of the plurality of the first and the second terminals 120 and 140 to apply the transport fare policy at the same time, in step S980. Here, the transport fare policy application instructing unit 440 may generate timing information for the first and the second terminals 120 and 140 to apply the transport fare policy, for example, to be effective at the same time or each at respective specified times.

The transport fare policy application instructing unit 440 may transmit the generated timing information to the communication unit 220 in the first and the second stations 110 and 130, in steps S991 and S992. Here, the communication unit 220 in the first and the second stations 110 and 130 may transmit the timing information to the transport fare policy applying unit 320 in the plurality of the first and the second terminals 120 and 140, in steps S1001 and S1002. The transport fare policy applying unit 320 in the plurality of the first and the second terminals 120 and 140 may apply the transport fare policy based on the timing information at the specified time, in steps S1011 and S1012.

As broadly described and embodied herein, a transport fare management system of the present disclosure overcomes various disadvantages of conventional fare management systems and methods. In conventional technology, a disadvantage exists in that the entire transport fare system must be newly established whenever various fares are introduced or changed. It is desirable, however, that a transport fare management system be capable of entirely re-applying a changed fare for a plurality of areas or a plurality of transport means without additional costs of the conventional systems.

Embodiments provided herein is a transport fare management method, a transport fare management server and a transport fare management system that modularizes various transport fares used in a transport fare policy and allows selection of one of the complex transport fares modularized according to the transport fare policy to only transmit a parameter for each of the modules to a terminal. The transport fare management method may be simply applied to a transport fare policy when a new transport fare policy is established or a previous transport fare policy is changed without requiring a new development of a transport fare management system.

Embodiments of the present disclosure provide a transport fare management method, a transport fare management server and a transport fare management system that allow selecting a changed transport fare module in comparison with a previous transport fare policy among a selected transport fare modules according to a transport fare policy and transmitting a parameter of the selected transport fare module to a terminal.

Embodiments of the present disclosure provide a transport fare management method, a transport fare management server and a transport fare management system that allow instructing to apply a transport fare policy to a terminal of each of transport means about distinct transport means associated with each other. The transport fare management method may entirely reflect a new transport fare policy by applying the transport fare policy about each of distinct transport means at the same time.

In some embodiments, a transport fare management method is performed by a transport fare management server. The transport fare management server may be coupled to first and second stations managing transport payment information respectively gathered by a plurality of first and second terminals. The plurality of the first and second terminals may be coupled to transport payment means. The transport fare management method may include selecting at least one of a plurality of transport payment modules according to a transport fare policy, setting at least one parameter in the selected at least one transport payment module and transmitting the set at least one parameter to the plurality of the first and second terminals through the first and second stations to apply the transport fare policy to the plurality of the first and second terminals.

In one embodiment, the plurality of the transport payment modules may correspond to a software component being predefined by the plurality of the first and second terminals and being used to determine the transport fare policy.

In one embodiment, the plurality of the transport payment modules may include at least one of a single fare module, a section fare module, a distance proportion fare module, a profile fare module, a time section fare module, a pass master fare module, a pass penalty fare module, a profile penalty fare module and a transfer discount fare module.

In one embodiment, setting the at least one parameter may include receiving a parameter according to a selection of a corresponding transport fare module and checking an allowance range for the received parameter. The parameter may correspond to an attribute that classifies data being objectively obtainable or data being subjectively obtainable to represent a corresponding transport fare module.

In one embodiment, transmitting the set at least one parameter to the plurality of the first and second terminals through the first and second stations may include detecting a changed transport fare module among the plurality of the transport fare modules and transmitting a parameter in the detected transport fare module to the plurality of the first and second terminals.

In one embodiment, transmitting the set at least one parameter to the plurality of the first and second terminals through the first and second stations may include transmitting time information applying the transport fare policy and the transmitted parameter at one time to the plurality of the first and second terminals.

In one embodiment, transmitting the set at least one parameter to the plurality of the first and second terminals through the first and second stations includes transmitting the parameter to the plurality of the first and second terminals and then transmitting the time information applying the transport fare policy to the plurality of the first and second terminals.

In some embodiments, a transport fare management method performed by a transport fare management system includes a plurality of first and second terminals coupled to transport payment means, first and second stations managing transport payment information respectively gathered by the plurality of the first and second terminals and a transport fare management server coupled to the first and second stations. The transport fare management method comprises the transport fare management server selecting at least one of a plurality of transport fare modules according to a transport fare policy, the transport fare management server setting at least one parameter in the selected at least one of the plurality of the transport fare modules, the transport fare management server transmitting the set at least one parameter to the plurality of the first and second terminals through the first and second stations and the plurality of the first and second terminals applying the transport fare policy.

In one embodiment, the plurality of the transport fare modules may correspond to a software component being predefined by the plurality of the first and second terminals and being used to determine the transport fare policy. The plurality of the transport payment modules may include at least one of a single fare module, a section fare module, a distance proportion fare module, a profile fare module, a time section fare module, a pass master fare module, a pass penalty fare module, a profile penalty fare module and a transfer discount fare module.

In one embodiment, setting the at least one parameter may include the transport fare management server receiving a parameter according to a selection of a corresponding transport fare module and the transport fare management server checking an allowance range for the received parameter when the parameter is received. The parameter may correspond to an attribute that classifies data being objectively or subjectively obtainable to represent a corresponding transport fare module.

In one embodiment, the transport fare management server transmitting the set at least one parameter to the plurality of the first and second terminals through the first and second stations may include the transport fare management server detecting a changed transport fare module among the plurality of the transport fare modules and the transport fare management server transmitting a parameter in the detected transport fare module to the plurality of the first and second terminals.

In one embodiment, the plurality of the first and second terminals applying the transport fare policy may include receiving time information applying the transport fare policy and the transmitted parameter at one time from the transport fare management server.

In one embodiment, the plurality of the first and second terminals applying the transport fare policy may include transmitting the parameter to the plurality of the first and second terminals and then transmitting the time information applying the transport fare policy to the plurality of the first and second terminals.

In some embodiments, a transport fare management server is coupled to first and second stations managing transport payment information respectively gathered by a plurality of first and second terminals. The plurality of the first and second terminals is coupled to transport payment means. The transport fare management server comprises a transport fare module selection unit configured to select at least one of a plurality of transport payment modules according to a transport fare policy a parameter setting unit configured to set at least one parameter in the selected at least one transport payment module and a parameter transmitting unit configured to transmit the set at least one parameter to the plurality of the first and second terminals through the first and second stations to apply the transport fare policy to the plurality of the first and second terminals.

In one embodiment, the transport fare management server may further comprise a transport fare policy applying order unit configured to transmit the time information applying the transport fare policy to the plurality of the first and second terminals after the parameter transmitting unit transmits the parameter to the plurality of the first and second terminals.

In some embodiments, in a transport fare management system including a plurality of first and second terminals coupled to transport payment means, first and second stations managing transport payment information respectively gathered by the plurality of the first and second terminals and a transport fare management server coupled to the first and second stations, wherein the transport fare management server comprises a transport fare module selection unit configured to select at least one of a plurality of transport payment modules according to a transport fare policy, a parameter setting unit configured to set at least one parameter in the selected at least one transport payment module and a parameter transmitting unit configured to transmit the set at least one parameter to the plurality of the first and second terminals through the first and second stations to apply the transport fare policy to the plurality of the first and second terminals.

A transport fare management method according to an example embodiment of the present disclosure and related techniques may modularize various transport fares used in a transport fare policy and select at least one of complex transport fares modularized according to a transport fare policy to transmit a parameter of each of modules to a terminal. The transport fare policy may be simply applied without newly developing the transport fare management system although a new transport fare policy is established or a previous transport fare policy is changed.

A transport fare management method according to an example embodiment of the present disclosure and related techniques may select a changed transport fare module in comparison with a previously applied transport fare policy among a transport fare modules selected by a transport fare policy and may simply apply the changed transport fare policy by transmitting a parameter in a selected transport fare module to a terminal.

A transport fare management method according to an example embodiment of the present disclosure and related techniques may entirely reflect a new transport fare policy to apply the transport fare policy about each of distinct transport means at the same time by instructing to apply the transport fare policy to terminal of each of transport means about distinct transport means associated with each other (e.g., an urban bus and a subway associated with a transfer system).

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for programming updates to payment terminals of a transportation system, the method comprising:
   selecting, in a transit management server, at least one fare algorithm from a plurality of fare algorithms according to a transit fare policy, the at least one fare algorithm corresponding to a prescribed category of fare and being associated with determining a fare based on the prescribed category, the selected fare algorithm identifying an attribute for the prescribed category of fare;
   setting, in the transit management server, at least one parameter in the selected fare algorithm, the parameter identifying a value for the selected attribute, wherein setting the at least one parameter includes:
      identifying a first value associated with the attribute according to the selected fare algorithm,
      determining whether the first value is outside a prescribed range associated with the attribute, the at least one parameter being set to the first value when the first value is not outside the prescribed range associated with the attribute, and
      when the first value is outside the prescribed range associated with the attribute, providing an interface to receive a second value and setting the at least one parameter to the second value;

transmitting, from the transit management server to the payment terminals communicatively coupled to the transit management server, the set parameter to update a corresponding fare algorithm in the payment terminals according to the transit fare policy, wherein different logic is used to calculate fares for each of the fare algorithms, and the different logics used in the fare algorithms to calculate the fares are already implemented in the payment terminals prior to transmitting the set parameters, wherein the set parameter is managed in the transmit management server, and wherein transmitting the set parameters includes identifying two or more of the payment terminals, and forwarding the set parameters to the identified two or more payment terminals;

receiving, by the transit management server and from the two or more payment terminals, messages indicating respective completions of updating the corresponding fare algorithm by the two or more payment terminals; and transmitting, from the transit management server and in response to receiving the messages from the two or more payment terminals, time information to the two or more payment terminals at the same time, the time information identifying a prescribed time and causing the two or more payment terminals to concurrently implement the updated corresponding fare algorithm at the prescribed time, wherein the two or more payment terminals maintain respective databases storing transport payment information and, when updating the corresponding fare algorithm, identify one or more parameters of the corresponding fare algorithm associated with the set parameter, determine updated values for the one or more parameters based on the set parameter, and update the databases to store the updated values, and wherein the two or more payment terminals do not use the stored updated values for the one or more parameters before the prescribed time and implement the updated corresponding fare algorithm by accessing the stored updated values for the one or more parameters at the prescribed time and determining the transit fares based on the stored updated values.

2. The method of claim 1, wherein one or more of the fare algorithms are stored in the transit management server and the payment terminals, and are used to define the transit fare policy.

3. The transit fare management method of claim 2, wherein the at least one fare algorithm corresponding to the prescribed category of fare includes at least one of a single fare algorithm, a section fare algorithm, a distance proportion fare algorithm, a profile fare algorithm, a time section fare algorithm, a pass master fare algorithm, a pass penalty fare algorithm, a profile penalty fare algorithm or a transfer discount fare algorithm.

4. The method of claim 1, wherein the attribute relates to at least one of a travel attribute or a user attribute.

5. The method of claim 4, wherein the travel attribute relates to at least one of a boarding time, a departure time, a distance traveled, transfer information or a geographical location, and the user attribute includes at least one of whether the user is an adult, an adolescent, elderly, a student or a person with a disability, and wherein the prescribed range of the parameter is a maximum or minimum fare associated with a corresponding attribute.

6. The method of claim 1, wherein transmitting the set parameter to the payment terminals includes:
detecting a change in a fare algorithm among the at least one fare algorithm; and
transmitting a parameter in the detected fare algorithm to the payment terminals.

7. The method of claim 1, wherein transmitting the set parameter from the transit management server to the payment terminals includes transmitting the set parameter through a network device communicatively coupled to the transit management server and the payment terminals, the network device being associated with a transit station and at least one of the payment terminals associated with the transit station.

8. A server to program updates to payment terminals of a transportation system, comprising:
a network interface for communicatively coupling to at least one remote network device that is communicatively coupled to payment terminals;
a storage device that stores a plurality of fare algorithms according to a transit fare policy, the plurality of fare algorithms corresponding to a prescribed category of fare and configured to determine a fare based on the prescribed category; and
a controller configured to manage the fare policy using the plurality of fare algorithms, the controller being configured to:
select at least one fare algorithm according to the transit fare policy;
set at least one parameter in the selected fare algorithm;
transmit the set parameter to the payment terminals through the at least one remote network device to apply the transit fare policy to the payment terminals, wherein different logic is used to calculate fares for each of the fare algorithms and the different logics used in the fare algorithms to calculate the fares are already implemented in the payment terminals prior to transmitting the set parameters, wherein the set parameter is managed in the server, and wherein the controller, when transmitting the set parameters, further identifies two or more of the payment terminals, and forwards the set parameters to the identified two or more payment terminals;
receive, from the two or more payment terminals, messages indicating respective completions of updating the corresponding fare algorithm by the two or more payment terminals; and
transmit, in response to receiving the messages from the two or more payment terminals, time information to the two or more payment terminals at the same time, the time information identifying a prescribed time and causing the two or more payment terminals to concurrently implement the updated corresponding fare algorithm at the prescribed time,
wherein the two or more payment terminals maintain respective databases storing transport payment information and, when updating the corresponding fare algorithms, identify one or more parameters of the corresponding fare algorithm associated with the set parameter, determine updated values for the one or more parameters based on the set parameter, and update the databases to store the updated values,
wherein the two or more payment terminals do not use the stored updated values for the one or more parameters before the prescribed time and implement the updated corresponding fare algorithm by accessing the stored updated values for the one or more parameters at the prescribed time and determine the transit fares based on the stored updated values, and wherein the controller, when setting the at least one parameter is further configured to:
identify a first value associated with the attribute according to the selected fare algorithm;
determine whether the first value is outside a prescribed range associated with the attribute, the at least one parameter being set to the first value when the first value is not outside the prescribed range associated with the attribute, and
when the first value is outside the prescribed range associated with the attribute, provide an interface to receive a second value, the at least one parameter being set to the second value.

9. The server of claim 8, wherein the plurality of fare algorithms are stored in the payment terminal, and are used to define the transit fare policy in the payment terminals.

10. The server of claim 9, wherein the at least one fare algorithm corresponding to the prescribed category of fare is selected among at least one of a single fare algorithm, a section fare algorithm, a distance proportion fare algorithm, a profile fare algorithm, a time section fare algorithm, a pass master fare algorithm, a pass penalty fare algorithm, a profile penalty fare algorithm or a transfer discount fare algorithm.

11. The server of claim 8, wherein the attribute relates to at least one of a travel attribute or a user attribute, the travel attribute including at least one of boarding time, departure time, distance traveled, transfer information or geographical location, and the user attribute including at least one of whether a user is an adult, an adolescent, elderly, a student or a person with a disability, and wherein the prescribed range of the parameter is a maximum or minimum fare associated with a corresponding attribute.

12. The server of claim 8, wherein the controller is configured to detect a change in a fare algorithm among the plurality of fare algorithms, and transmit a parameter in the detected fare algorithm to the payment terminals.

13. A system for programming updates to payment terminals of a transportation system, comprising:
a management server that manages the transportation system; and
the payment terminals which are communicatively coupled to the management server and configured to determine a fare based on a transit fare policy from the management server,
wherein:
a plurality of fare algorithms for defining the transit fare policy is stored on the management server and the payment terminals,
the management server:
selects at least one fare algorithm according to the transit fare policy,
sets at least one parameter in the selected fare algorithm,
transmits the set parameter to the payment terminals, wherein different logic is used to calculate fares for each of the fare algorithms, and the different logics used in the fare algorithms to calculate the fares are already implemented in the payment terminals prior to transmitting the set parameters, wherein the set parameter is managed in the transmit management server, and wherein the management server, when transmitting the set parameters, further identifies two or more of the payment terminals, and forwards the set parameters to the identified two or more payment terminals,
receives, from the two or more payment terminals, messages indicating respective completions of updating the corresponding fare algorithm by the two or more payment terminals, and
transmits, in response to receiving the messages from the two or more payment terminals, time information to the payment terminals at the same time, the time information identifying a prescribed time and causing the payment terminals to concurrently implement the updated corresponding fare algorithm at the prescribed time,
the two or more payment terminals maintain respective databases storing transport payment information and, when updating the corresponding fare algorithms, identify one or more parameters of the corresponding fare algorithm associated with the set parameter, determine updated values for the one or more parameters based on the set parameter, and update the databases to store the updated values,
the two or more payment terminals do not use the stored updated values for the one or more parameters before the prescribed time and implement the updated corresponding fare algorithm by accessing the stored updated values for the one or more parameters at the prescribed time and determine the transit fares based on the stored updated values, and
the management server, when setting the at least one parameter:
identifies a first value associated with the attribute according to the selected fare algorithm,
determines whether the first value is outside a prescribed range associated with the attribute, the at least one parameter being set to the first value when the first value is not outside the prescribed range associated with the attribute, and
provides, when the first value is outside the prescribed range associated with the attribute, an interface to receive a second value, the at least one parameter being set to the second value, and
at least one fare terminal receives the set parameter from the management server and updates a fare algorithm corresponding to the selected fare algorithm on the server to apply the transit fare policy in the payment terminals.

* * * * *